United States Patent [19]

Heinz et al.

[11] Patent Number: 5,286,809
[45] Date of Patent: Feb. 15, 1994

[54] THERMOPLASTIC MOULDING COMPOUNDS

[75] Inventors: Hans-Detlef Heinz; Burkhard Köhler, both of Krefeld, Fed. Rep. of Germany

[73] Assignee: Bayer AG, Leverkusen, Fed. Rep. of Germany

[21] Appl. No.: 803,616

[22] Filed: Dec. 9, 1991

[30] Foreign Application Priority Data

Dec. 22, 1990 [DE] Fed. Rep. of Germany ....... 4041519

[51] Int. Cl.$^5$ .............................................. C08F 283/04
[52] U.S. Cl. ................................... 525/420; 525/471; 525/537; 528/388
[58] Field of Search ...................... 525/420, 471, 537; 528/388

[56] References Cited

U.S. PATENT DOCUMENTS

| | | |
|---|---|---|
| 4,276,397 | 6/1981 | Froix et al. .......................... 525/448 |
| 4,292,416 | 9/1981 | Shue et al. .......................... 525/420 |
| 4,528,335 | 7/1985 | Selby et al. .......................... 525/420 |
| 4,968,761 | 11/1990 | Kohler et al. ........................ 525/537 |
| 5,086,129 | 2/1992 | Kohler et al. ........................ 525/537 |

FOREIGN PATENT DOCUMENTS

| | | |
|---|---|---|
| 0087038 | 8/1983 | European Pat. Off. . |
| 0394933 | 10/1990 | European Pat. Off. . |
| 0414055 | 2/1991 | European Pat. Off. . |
| 0416363 | 3/1991 | European Pat. Off. . |
| 0424939 | 5/1991 | European Pat. Off. . |
| 55-45704 | 3/1980 | Japan . |

Primary Examiner—John C. Bleutge
Assistant Examiner—Helen F. Lee
Attorney, Agent, or Firm—Connolly and Hutz

[57] ABSTRACT

This invention relates to thermoplastic moulding compounds based on polyamides and/or polyesters and special functionally modified polyarylene sulphides and optionally conventional additives and to their preparation and their use.

2 Claims, No Drawings

THERMOPLASTIC MOULDING COMPOUNDS

This invention relates to thermoplastic moulding compounds based on polyamides and/or polyesters and special functionally modified polyarylene sulphides and optionally conventional additives and to their preparation and their use.

Polyarylene sulphides having functional groups are known (e.g. U.S. Pat. No. 3,354,129, Intern. J. Polymeric Mater. 11 (87) 263). Phenylene sulphide polymers and oligomers having functional end groups such as carboxyl, nitrile, etc. (telechelates) are also known (e.g. Polymer Bulletin 4 (81) 459, FR-A 2 470 780, DE-A 3 421 608, DE-A 3 421 610).

Some of the described polyarylene sulphides modified with functional groups are difficult to prepare as they require the use of a monomer containing functional groups for the synthesis of the polymer. Such comonomers are liable to render synthesis more difficult, give rise to unwanted side reactions during the reaction or contaminate the circulations of the manufacturing process owing to incomplete incorporation in the polymer chain.

Modification of polyarylene sulphides with OH and/or $NH_2$ groups is difficult during polymerisation since halogen-containing phenols and/or anilines interfere with the polymerisation reaction of dihalogenated benzenes with the source of sulphur. Phenols are used as regulators in the synthesis of polyarylene sulphides, e.g. DE-A 3 601 215.

Our own, hitherto unpublished Patent Applications P 3 927 658.9 (Le A 27 064) and P 3 929 171.5 (Le A 27 088) describe polyarylene sulphides grafted with functional groups, in which grafting takes place on a previously prepared arylene sulphide polymer at elevated temperatures, preferably solvent-free in kneaders and extruders. It has now been found that these functionally grafted polyarylene sulphides are very suitable for the production of alloys with polymers containing amide and/or ester groups.

The present invention therefore relates to thermoplastically processible compositions of
1. at least one polymer containing amide and/or ester groups in the molecule with the exclusion of aromatic polycarbonates and polyester carbonates and aromatic, liquid crystalline polyesters and polyester carbonates,
2. at least one functionally grafted arylene sulphide polymer prepared by the reaction of from 80 to 99% by weight of arylene sulphide polymers, preferably polyparaphenylene sulphide, with from 0.1 to 20% by weight of functionally substituted aromatic compounds corresponding to formulae (I) to (V):

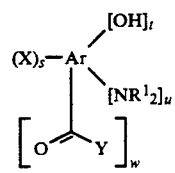

(I)

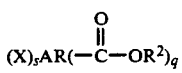

(II)

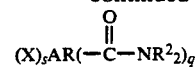

(III)

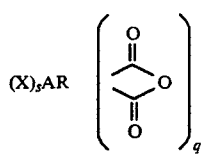

(IV)

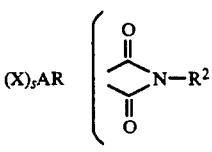

(V)

wherein
X stands for a nitro group or a sulphonic group or an alkali metal sulphonate group,
$R^1$ stands for hydrogen, a $C_1$-$C_{22}$-alkyl group which may be substituted by OH or $NH_2$ groups, a $C_1$-$C_{22}$-acyl group or a $C_6$-$C_{14}$-aryl group which may be substituted by OH or $NH_2$ groups,
$R^2$ stands for a hydrogen atom, a $C_1$-$C_{12}$-alkyl group, a $C_6$-$C_{14}$-aryl group or a $C_7$-$C_{12}$-arylalkyl group, preferably hydrogen,
Ar stands for an aromatic $C_{6-20}$-group which may be substituted by $C_{1-22}$-alkyl groups, nitro groups, nitroso groups, halogen (e.g. Cl, Br) or sulphonic acid or alkali metal sulphonate groups,
Y stands for $R_1$ or for an $OR^1$- or $NR^1{}_2$-group in which $R^1$ has the meaning already indicated,
q stands for 1, 2 or 3, preferably 1 or 2,
s stands for 1, 2 or 3 and
t, u and w stand for 0, 1, or 2,
and the sum of (s+t+u+w) is less than 6 and the sum of (t+u) is greater than or equal to 1, the reaction being carried out at temperatures of at least 200° C. but preferably in the melt without solvent above the melting point of the arylene sulphide polymer in kneaders or extruders, and optionally
3. up to 250% by weight, based on 1)+2), of conventional additives.

Polyamides or Polyesters (1)

The polymers 1, used are preferably aliphatic polyamides and aliphatic aromatic polyesters.

Examples of these are Polyamide 6, 66, 46, 610, 612, 1212, 11, 12, 6T6, 6T/6, 69, 6/66 copolyamides, PA 6I, PA 6I6, poly-m-xylylene adipamide and others, and polyethylene terephthalate, polybutylene terephthalate and polyesters based on terephthalic acid, cyclohexane dimethanol and optionally other monomers.

Functionally Grafted Polyphenylene Sulphides (2)

The following are examples of functionally substituted aromatic compounds corresponding to formulae (I) to (V) which may be used as graft components for polyphenylene sulphides:
2-, 3- and 4-Nitrobenzoic acid, 5-nitro-isophthalic acid, 2-, 3- and 4-sulphobenzoic acid, 3,5-dinitrobenzoic acid, 5-sulphoisophthalic acid, 3- and 4-sulpho-phthalic acid anhydride, 3- and 4-nitrophthalic acid anhydride, 4-sulphonaphthalene-1,8-dicarboxylic acid anhydride, 4-nitronaphthalene-1,8-dicarboxylic acid anhydride, 2-, 3- and 4-hydroxybenzene sulphonic acid, 2-hydroxy-5-nitrobenzene sulphonic acid, 4-hydroxy-3-nitrobenzene sulphonic acid, 1-hydroxy-2-naphthalene sulphonic acid, 4-hydroxy-2-naphthalene sulphonic acid, 4-hydroxy-1-naphthalene sulphonic acid, 5-hydroxy-2-naphthalene sulphonic acid, 8-hydroxy-2-naphthalene sulphonic acid, 8-hydroxy-1-naphthalene sulphonic acid, 5-hydroxy-1,6-naphthalene sulphonic acid, 4-hydroxy-2,7-naphthalene sulphonic acid, 4-hydroxy-2,6-naphthalene disulphonic acid, 8-hydroxy-1,6-naphthalene sulphonic acid, 4-hydroxy-1,5-naphthalene disulphonic acid, 3-hydroxy-1-naphthalene sulphonic acid, 3-hydroxy-7-nitro-1-naphthalene sulphonic acid, 6-hydroxy-1-naphthalene sulphonic acid, 6-hydroxy-2-naphthalene sulphonic acid, 7-hydroxy-2-naphthalene sulphonic acid, 4-hydroxy-1,3,5-naphthalene trisulphonic acid, 7-hydroxy-1-naphthalene sulphonic acid, 2-hydroxy-6-nitro-1,4-naphthalene disulphonic acid, 3-hydroxy-2,7-naphthalene disulphonic acid, 3-hydroxy-2,6-naphthalene disulphonic acid, 3-hydroxy-1,5-naphthalene disulphonic acid, 6-hydroxy-1,3-naphthalene disulphonic acid, 7-hydroxy-1,3-naphthalene disulphonic acid, 7-hydroxy-1,3,6-naphthalene trisulphonic acid, 6-hydroxy-1,3,8-pyrene-trisulphonic acid, 4,8-dihydroxy-2,6-naphthalene disulphonic acid, 4,7-dihydroxy-2-naphthalene sulphonic acid, 4,6-dihydroxy-2-naphthalene sulphonic acid, 4,5-dihydroxy-2,7-naphthalene disulphonic acid, 6,7-dihydroxy-2-naphthalene sulphonic acid, 3,6-dihydroxy-2-naphthalene sulphonic acid, 3,6-dihydroxy-2,7-naphthalene disulphonic acid, 6,8-dihydroxy-1,3-pyrene-disulphonic acid, 6-hydroxy-5-nitroso-2-naphthalene sulphonic acid, 2-hydroxy-5-sulphobenzoic acid, 4-hydroxy-2-sulphobenzoic acid, 1-hydroxy-4,7-disulpho-2-naphthalene carboxylic acid, 3-hydroxy-7-sulpho-2-naphthalene carboxylic acid, 3,5-dihydroxy-7-sulpho-2-naphthalene carboxylic acid, 2-aminobenzenesulphonic acid, 2-amino-5-chlorobenzene sulphonic acid, 2-amino-3,5-dichlorobenzene sulphonic acid, 2-amino-5-nitrobenzene sulphonic acid, 2-amino-3,5-dinitrobenzene sulphonic acid, 3-aminobenzene sulphonic acid, 3-amino-4-chlorobenzene sulphonic acid, 5-amino-2-chlorobenzene sulphonic acid, 2-amino-2,4,5-trichlorobenzene sulphonic acid, 5-amino-2-nitrobenzene sulphonic acid, 4-aminobenzene sulphonic acid, 4-(phenylamino)-benzene sulphonic acid, 4-(benzylamino)-benzene sulphonic acid, N-(2-amino-4-nitrophenyl)-sulphanilic acid, 4-amino-2-nitrobenzene sulphonic acid, 4-amino-3-nitrobenzene sulphonic acid, 4-amino-3,5-dinitrobenzene sulphonic acid, 2,4-diaminobenzene sulphonic acid, 2,5-diaminobenzene sulphonic acid, 5-amino-2-(phenylamino)benzene sulphonic acid, N,N'-bis-(4-amino-2-sulphophenyl)-p-phenylene diamine, 5-amino-2-(4-aminophenyl)-aminobenzene sulphonic acid, 3-amino-4-(phenylamino)-benzene sulphonic acid, 5-amino-2-methylbenzene sulphonic acid, 2-amino-5-chloro-3-methyl-benzene sulphonic acid, 2,4-diamino-5-methyl-benzene sulphonic acid, 3-amino-4-methyl-benzene sulphonic acid, 2-amino-3,5-dimethylbenzene sulphonic acid, 2-amino-1-naphthalene sulphonic acid, 4-amino-1-naphthalene sulphonic acid, 5-amino-1-naphthalene sulphonic acid, 5-amino-8-nitro-1-naphthalene sulphonic acid, 6-amino-1-naphthalene sulphonic acid, 7-amino-1-naphthalene sulphonic acid, 7-amino-5-nitro-1-naphthalene sulphonic acid, 8-amino-1-naphthalene sulphonic acid, 1-amino-2-naphthalene sulphonic acid, 5-amino-2-naphthalene sulphonic acid, 6-amino-2-naphthalene sulphonic acid, 7-(methylamino)-2-naphthalene sulphonic acid, benzidine-3-sulphonic acid, aniline-3,5-disulphonic acid, 4,6-diamino-1,3-benzene-disulphonic acid, 3-amino-1,5-naphthalene-disulphonic acid, 3-amino-7-nitro-1,5-naphthalene-disulphonic acid, 4,5-diamino-2,7-naphthalene-disulphonic acid, benzidine-2,2'-disulphonic acid, 5-amino-2-hydroxybenzene sulphonic acid, 5-amino-2-hydroxy-3-nitrobenzene sulphonic acid, 3-amino-4-hydroxybenzene sulphonic acid, 7-amino-4-hydroxy-2-naphthalene sulphonic acid, 4-amino-5-hydroxy-1,7-naphthalene disulphonic acid, 8-amino-1-naphthol-3,6-disulphonic acid, 4-amino-5-hydroxy-1,3-naphthalene disulphonic acid, 5-sulphoanthranilic acid, 5-sulpho-N-methyl-anthranilic acid, 5-amino-2-hydroxy-3-sulphobenzoic acid and the N-acetyl compounds of the above-mentioned amino compounds.

Additives (3)

The following are examples of additives (3) which may be used: Lubricants, mould release agents, nucleating agents, dyes, pigments, UV stabilizers, antioxidants, fillers/reinforcing materials (preferably glass fibres, carbon fibres, glass spheres, aramide fibres and mineral fillers), flame retardants, polymeric alloying partners, substances which reduce the water absorption of polyamides (preferably bisphenols and phenol-formaldehyde Novolaks), etc.

The following are examples of suitable polymeric alloying partners: Diene rubbers, acrylate rubbers, polyethylenes, polypropylenes, ethylene-propylene copolymers, ethylene-1-butene copolymers, ethylene-propylene-diene terpolymers, ethylene/acrylic acid/acrylic ester terpolymers, ethylene/vinyl acetate copolymers, polyoctenylenes, polystyrenes, styrene/(meth)acrylonitrile copolymers, (meth)acrylonitrile/butadiene/styrene copolymers (ABS), high impact strength polystyrenes, polycarbonates, aromatic polyester (carbonate)s, polyesters such as polyethylene terephthalate unmodified polyarylene sulphides, polysulphones, polyphenylene oxides, polyether ketones, polyether ether ketones, polyamidimides, polyether sulphones, polyether imides, polyester imides and polyimides known in the art as alloying partners and modifiers.

The polymeric alloying partners should if necessary be chemically modified, or at least partially, so that partial coupling of the two phases will take place. This may be achieved by, for example, using a copolymer of ethylene and/or propylene and small quantities of acrylic acid or an ethylene/propylene(diene) polymer grafted with small quantities of maleic acid anhydride or a polyphenylene oxide grafted with small quantities of maleic acid anhydride, either alone or as mixtures with unmodified alloying partners. Coupling may also take place via ester or epoxide groups. It may also take place if, for example, suitable low molecular weight or polymeric compatibility imparting agents are present; for example, an acrylonitrile/styrene/acrylic acid terpolymer may be used as compatibility imparting agent in alloys with ABS. The alloying partners may also contain reactive end groups capable of reacting with the polyamide, e.g. amino- or carboxyl-terminated polydiene rubbers.

The rubbers may also be grafted in a core/sheath structure.

Amorphous polymers which may be compatible and-/or incompatible with the polyamides to be used according to the invention may also be used as additives; for example, PA 6 I (polyhexamethylene isophthalamide) or polyamides of isophthalic acid, terephthalic acid, hexamethylene diamine and optionally 4,4'-diaminodicyclohexylmethane may be used as amorphous polyamides.

Preferred alloying partners are those conventionally used for increasing the impact strength at low temperatures and/or in the dry state (impact strength modifiers) and amorphous thermoplasts having glass temperatures of at least 90° C., preferably at least 120° C., most preferably at least 160° C.

Preparation of the moulding compounds according to the invention is carried out by mixing the components in the solvent-free molten state, optionally as concentrates, in one or more stages, preferably in kneaders or extruders.

Components 1) and 2) are preferably present in the mixtures in ratios of from 0.1–99 to 99.9–0.1 parts by weight. Mixtures composed of from 40 to 99.5% by weight of 1) and from 0.5 to 60% by weight of 2) or from 60 to 99.9% by weight of 2) and from 0.5 to 40% by weight of 1) are particularly preferred.

Components 3) are additionally present in the completed mixture in quantities of from 0 to 120% by weight, most preferably from 0.001 to 100% by weight, based on 1)+2).

The functionally grafted arylene sulphide polymers 2) to be used according to the invention are known from our earlier, hitherto unpublished Patent Applications Le A 27 064 and Le A 27 088.

The reaction is preferably carried out without solvent at temperatures above the melting point of the polyarylene sulphide and up to 450° C., optionally under inert gas, preferably under shearing forces.

Suitable polyarylene sulphides, which are preferably polyphenylene sulphides, are known, e.g. from EP-A 171 021 and U.S. Pat. No. 3,354,129 and commercially available, e.g. as Tedur ® or Ryton ®.

The reaction may be carried out in kneaders or in (screw shaft) extruders.

The moulding compounds according to the invention have great hardness and rigidity. Compared with moulding compounds based on unmodified arylene sulphide polymers, they may have greater toughness values and elongation values. In polyamide fibres, components 2) result in greatly increased degrees of stretching and strength. Further, the water absorption is generally reduced compared with that of polyamides and the speed of crystallisation and the dimensional stability are increased. The fire characteristics may also be improved. Compared with polyamides, the moulding compounds according to the invention also frequently have greater dimensional stability under heat.

The moulding compounds according to the invention may be processed by injection moulding, extrusion, pultrusion, film-stacking and other known moulding processes to produce moulded articles, films, fibres, semi-finished goods, composites and other products. They are a valuable addition to the state of the art.

The following Examples, in which typical starting materials are used in typical quantities, serve to illustrate the invention without limiting it to these starting materials and quantities.

EXAMPLES

Examples 1 to 3 (Starting Materials of Type (2))

Polyparaphenylene sulphide having a viscosity of from 30 to 60 Pas at 310° C. and 1000 s$^{-1}$ was mixed in the dry state with, respectively, 2% by weight of sulphonaphthalene diacid anhydride (PPS a), 2% of sulphanilic acid (PPS b) and 2% of 1-hydroxy-2-naphthalene sulphonic acid (PPS c) and extruded through a ZSK 32 double shaft extruder at about 320° C. and granulated.

A maximum of 5% of the quantities of sulphonic acid used can be extracted from these modified arylene sulphide polymers by means of dioxane.

Examples 4 to 10 (According to the Invention)

Polyamide 6 ($\eta$rel=3.5; 1% in m-cresol, 25° C.) was compounded with 1% to 2% by weight of PPS a-c and without PPS (ZSK 53 double shaft extruder; 280° C.; without PPS: 260° C.; 30 kg/h).

Some mechanical properties of the samples are summarized in Table 1.

TABLE 1

| Example | 4 | 5 | 6 | 7 | 8 | 9 | 10 |
|---|---|---|---|---|---|---|---|
| PPS Type (%) | — | 1% a | 2% a | 1% b | 2% b | 1% c | 2% c |
| $\delta_R$ (MPa) | 47 | 45 | 58 | 44 | 44 | 50 | 59 |
| $E_z$ (MPa) | 2917 | 3085 | 3122 | 3111 | 3136 | 3155 | 3253 |
| $\epsilon_R$ (%) | 101 | 46 | 27 | 49 | 38 | 35 | 19 |
| $D_{bB}$ (MPa) | 109 | 113 | 114 | 113 | 113 | 115 | 115 |
| $D_bR$ (%) | 6.0 | 5.8 | 5.9 | 5.8 | 5.8 | 5.8 | 5.8 |
| $E_B$ (MPa) | 2643 | 2732 | 2760 | 2760 | 2760 | 2763 | 2752 |
| Izod an[1] | n.b. | n.b. | n.b. | n.b. | n.b. | n.b. | n.b. |
| HDT A (°C.) | 56 | 56 | 57 | 57 | 57 | 60 | 60 |
| HDT B (°C.) | 173 | 181 | 171 | 177 | 177 | 188 | 185 |
| H$_2$O Absorption (%), 70° C. | | | | | | | |
| 1 h | 1.37 | 1.40 | 1.35 | 1.38 | 1.37 | 1.41 | 1.42 |
| 2 h | 1.95 | 1.95 | 1.86 | 1.90 | 1.91 | 1.95 | 1.95 |
| 4 h | 2.85 | 2.81 | 2.70 | 2.74 | 2.74 | 2.79 | 2.79 |
| 8 h | 4.17 | 4.07 | 3.93 | 3.97 | 3.95 | 4.01 | 4.00 |
| 48 h | 9.45 | 9.04 | 8.92 | 8.97 | 8.91 | 8.90 | 8.92 |
| 120 h | 9.36 | 8.93 | 8.92 | 9.61 | 8.90 | 8.92 | 8.91 |

TABLE 1-continued

| Example | 4 | 5 | 6 | 7 | 8 | 9 | 10 |
|---|---|---|---|---|---|---|---|
| $T_K{}^{2)}$ (°C.) | 173.0 | 178.8 | 179.3 | 179.1 | 179.1 | 178.7 | 178.8 |

[1)] n.b. = not broken
[2)] crystallisation temperature on cooling, DSC

Examples 11 to 15

The compositions from Examples 4 to 6 and 9 and 10 were spun to fibres in an extruder spinning apparatus basically as described in our own hitherto unpublished German Patent Application P 4 002 607.8 (Le A 27 148).

The spinning conditions and fibre data are summarized in Table 2.

TABLE 2

| Example | 4/11 | 5/12 | 6/13 | 9/14 | 10/15 |
|---|---|---|---|---|---|
| PPS type | — | a | a | c | c |
| Quantity (%) | — | 1 | 2 | 1 | 2 |
| $T_{melt}$ (°C.) | 328 | 325 | 328 | 328 | 326 |
| Pressure (bar) | 29–30 | 29–30 | 29–30 | 30–31 | 30–31 |
| Draw off (mmin$^{-1}$) | 640 | 640 | 640 | 640 | 640 |
| Spinning draft | 22.8 | 23.1 | 22.7 | 23.4 | 22.6 |
| Stretching (°C.) (Heating rail) | 195 | 195 | 95 | 195 | 195 |
| Fixing (°C.) (Heating galette) | 170 | 170 | 170 | 170 | 170 |
| Degree of stretching: | | | | | |
| 1st Stage | 1:3.00 | 1:3.75 | 1:3.25 | 1:3.50 | 1:3.50 |
| 2nd Stage | 1:1.36 | 1:1.15 | 1:1.36 | 1:1.15 | 1:1.20 |
| Total | 1:4.09 | 1:4.33 | 1:4.43 | 1:4.03 | 1:4.2 |
| Titre (dtex) | 129 | 121 | 120 | 118 | 130 |
| Strength (cN/dtex) | 4.36 | 5.22 | 6.42 | 5.12 | 5.17 |

Examples 16 and 17

60 Parts of a 50% glass fibre reinforced PA 6 ($\eta$rel≈2.9) and 40% of PPA a or of an unmodified PPS (33 Pas at 310° C. at 1000 s$^{-1}$) were compounded in a ZSK 30-double shaft extruder and extruded to form test rods. Mechanical properties are summarized in Table 3.

TABLE 3

| Example | PPS | DbB$^{1)}$ (%) | SbB$^{1)}$ (%) | $a_n{}^{2)}$ (kJ/m$^2$) |
|---|---|---|---|---|
| 16 | a | 2.54 | 214.1 | 24.6 |
| 17 | unmodified | 2.04 | 188.3 | 20.8 |

[1)] Edge fibre elongation or bending stress at maximum force (DIN 53 452)
[2)] ISO 180, Method 1C

We claim:
1. Thermoplastically processible compositions of
   1) 60% by weight of 50% glass fiber reinforced polyamide 6,
   2) 40% by weight of a functionally grafted arylene sulphide polymer prepared by the reaction of 98% by weight of polyparaphenylene sulphide with 2% by weight of sulphonaphthalene diacid anhydride, the reaction being carried out at temperatures of about 320° C.
2. Moulded articles, films, fibres, composites and other products of polyamide moulding compounds according to claim 1.

* * * * *